May 25, 1937.  H. L. DICK  2,081,353
FILTER
Original Filed June 10, 1932   2 Sheets-Sheet 1
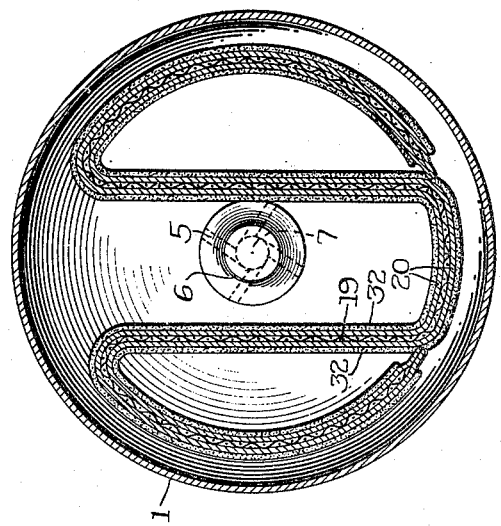
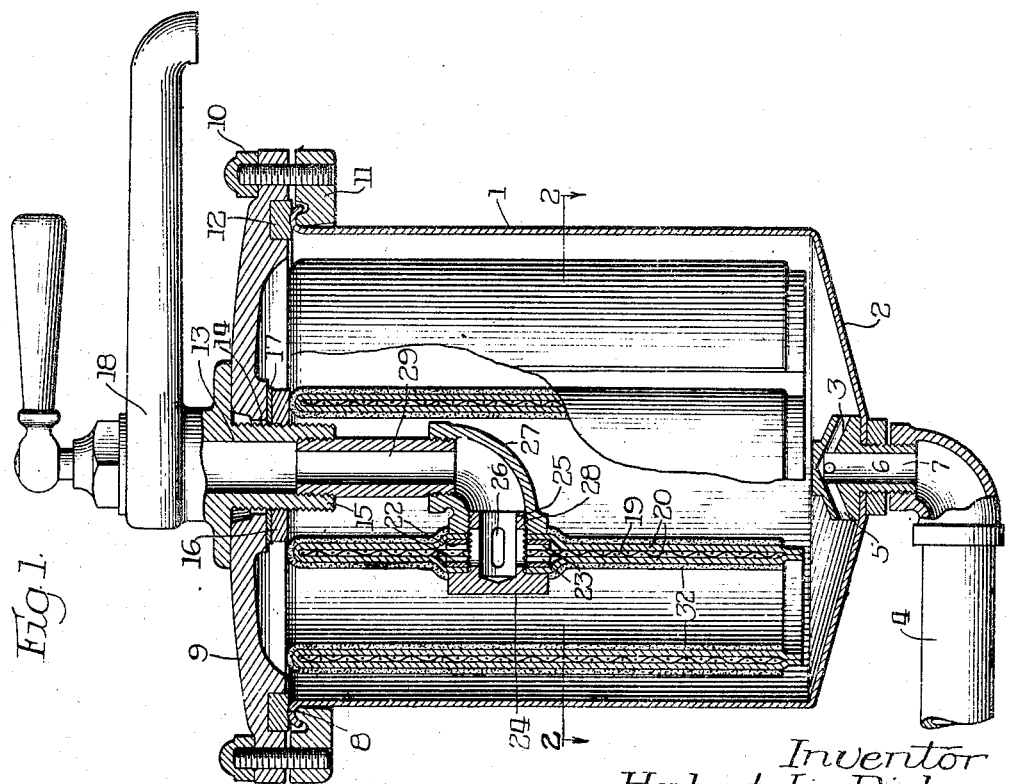
Inventor
Herbert L. Dick.
By Cromwell, Greist & Warden
Attys

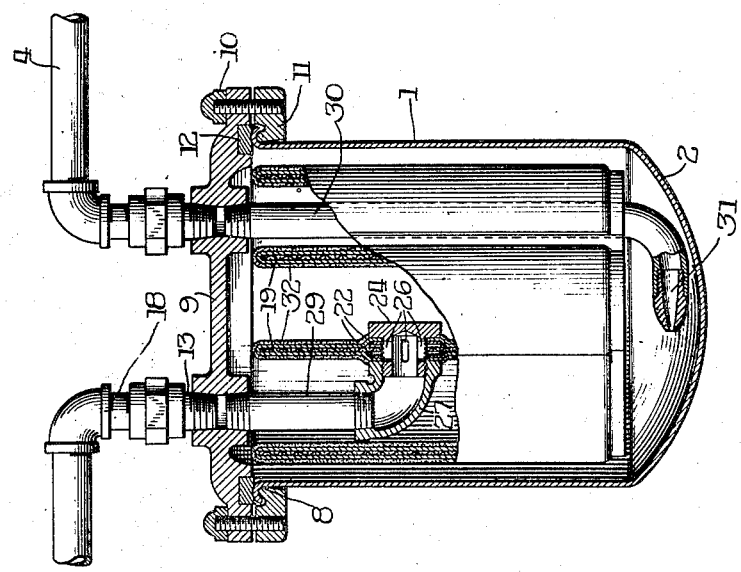
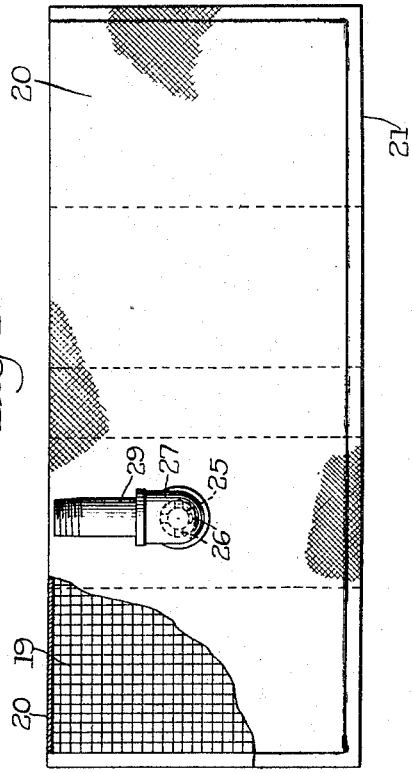
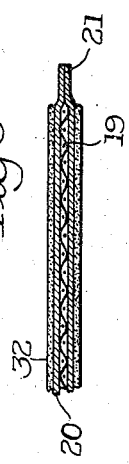
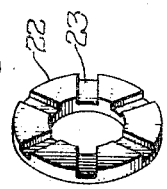

Patented May 25, 1937

2,081,353

UNITED STATES PATENT OFFICE 2,081,353

FILTER

Herbert L. Dick, Chicago, Ill.

Application June 10, 1932, Serial No. 616,381
Renewed October 21, 1936

6 Claims. (Cl. 210—165)

The present invention relates to filters and has particular reference to improvements in filters of the type especially adapted for use in purifying water for drinking purposes, and the like.

The water of most municipal systems contains relatively large quantities of various impurities, such as organic matter, dirt, chemicals such as chlorine, and even bacteria, which impart a disagreeable color, taste, and odor to the water, thereby rendering it undesirable for drinking purposes.

Various attempts have been made to provide a filter which may be used to purify water for household consumption. For example, stone filters have been employed in this connection for sometime. Stone filters are objectionable for several reasons, including their relatively slow rate of flow, necessity for frequent cleaning, and failure to eliminate color, taste and odor from the water.

A principal object of the present invention is to provide an improved method and apparatus for the purification of water or other liquids.

A further object is to provide a pressure filter which will effectively remove color, taste, and odor from water, as well as impurities such as suspended solids and colloids.

A still further object is to provide an improved filtering element and method for making the same.

Another object is to provide a filter of the household type in which the raw water is forced under pressure through a layer of a charge of prepared solids hydrostatically deposited upon a filter charge retainer such as cloth, paper or other retainers known in the art.

Still another object is the provision of a filter having a large filtering surface which occupies a relatively small space, so arranged as to require infrequent cleaning, and, when necessary, being easily cleaned and recharged.

These and other objects will be apparent from a consideration of the following description and by reference to the accompanying drawings, in which Fig. 1 is a sectional view of a filter made in accordance with my invention;

Fig. 2 is a cross sectional view taken along line 2—2 of Fig. 1;

Fig. 3 is a sectional view of a modified filter made in accordance with my invention;

Fig. 4 is a plan view, partly in section, showing my improved filter element;

Fig. 5 is an enlarged fragmentary view showing a section of the filtering element shown in Fig. 4; and Fig. 6 is an enlarged perspective view of the drainage seal washers used in connection with the filtering element.

It will be recognized that my improved filter is of general application, but for purposes of illustration and explanation, it will be described with reference to the purification of water for household purposes.

In the drawings 1 represents a cylindrical casing or container which has a bottom section 2 of inverted conical shape. The central portion of the bottom section is flattened at 3 and provided with an inlet opening. An inlet conduit 4 communicates with the inlet opening and is secured to the portion 3 by means of a distributor head 5 which extends from the inside of the casing through the inlet opening and engages the conduit 4 by means of suitable threads, a washer being interposed between the bottom section and the conduit 4 to insure a water-tight connection.

The distributor head 5 is provided with a plurality of openings 6 which are preferably tangential to the vertical opening 7 in order to agitate or produce a swirling motion of the water as it enters the bottom of the container. This swirling motion of the incoming water acts to disperse the charge thoroughly throughout the container, whereby the charge forms a dense uniform cake of finely comminuted particles upon the filter charge retainer when filtration takes place. The swirling water also reagitates any loose particles of the charge which fall from the filter charge retainer to the bottom of the container, permitting them again to be deposited on the retainer, as will be described more specifically hereinafter.

The upper edge of the container 1 is turned outwardly and downwardly to form an attaching rim 8. A top 9 is removably attached to the container by means of bolts 10 extending through the peripheral portion of the top and engaging an attaching ring 11 which fits beneath the attaching rim 8. To provide a water-tight connection between the top and the container, a gasket 12 is seated in a channel in the under side of the top and presses against the rim 8.

An outlet conduit 13 is mounted in a suitable opening 14 in the top or cover 9 by means of engagement of the downwardly extending portion 15 with a threaded nut 16, a washer 17 rendering the connection water-tight. The upper portion of the outlet conduit communicates with a valved faucet 18 by which the flow of water through the filter is controlled. It will be seen that the inlet conduit 4 maintains the container full of water held under the pressure of the source of supply. If desired, a valve may be included in the inlet conduit in addition to or in place of the valve in the outlet conduit, and it will be noted that when the valve is placed in the inlet conduit the container is under atmospheric pressure when this valve is closed.

As shown in Fig. 4, the filter element which is used in connection with my filter is produced by covering a suitable rigid drainage member 19 with a filter cloth or other suitable retaining member 20, the free edges of which extend beyond the drainage member and are sealed.

In accordance with a preferred form of my invention, the free edges of the cloth are formed into an integral and water-tight union 21 by means of a water insoluble adhesive agent. It is preferred to treat the free edges of the cloth with unvulcanized rubber and to vulcanize the treated edges together. The resultant union is firm, permanent and entirely water-tight.

The wire screen which constitutes the drainage member 19 in the modifications shown in the drawings is provided with an outlet opening intermediate its ends and preferably adjacent its central portion. On each side of the drainage member 19 and surrounding the outlet opening therein is mounted a drainage seal washer 22 which is secured to the screen or otherwise held in place. The drainage seal washers are provided with drainage channels 23 in order that the filtrate may pass into the outlet opening with minimum resistance.

The filter cloth extends over these drainage seal washers and is provided on each of its sides with an opening corresponding to the outlet opening in the wire screen. A headed drainage cap 24 abuts the filter cloth on one side of the drainage member 19 and has a hollow cylindrical portion 25 extending through the outlet opening in the drainage member and protruding from the opposite side of the filter element. Suitable perforations 26 are provided in the cylindrical portion 25 for drainage of the filtrate. An outlet connection 27 engages the protruding portion of the drainage cap 24 and is held in abutting relation to the filter cloth by means of threads 28.

By tightening the headed drainage cap 24 within the outlet connection 27, the filter cloth, which is preferably impregnated with rubber or similar substance about the openings, is held tightly between the drainage seal washer 22 and the outlet connection 27 on one side and between the other drainage seal washer 22 and the drainage cap 24 on the opposite side, thereby forming a water-tight joint.

The filter cloth preferably is secured about the wire drainage member 19 while the latter is in substantially flat form, as shown in Fig. 4. After formation of the sealed union 21 the rectangular wire screen and filter cloth are bent or formed into any suitable tortuous shape, the outside contour of which conforms substantially to the shape of the container. By forming the filter element in this manner a large surface or filter area is provided within a relatively small space. In the modifications shown in the drawings, the ends of the filter element are bent in the same direction about the central portion and then doubled back in the same direction so that the ends are adjacent the central portion. It will be understood that my object is to provide a tortuous shaped filter element and that the particular shape imparted to the filter element is immaterial. The surface presented for formation of the charge and the output of the filter is thereby greatly increased. The space between adjacent portions of the tortuous filter element is desirably made such that the layers of deposited charge on said adjacent portions will not touch or interfere with each other.

The outlet connection 27 communicates with and is rigidly connected to the outlet conduit 13 by means of a suitable threaded pipe 29. By this means the filter element is removed from the container with removal of the top, thereby making the interior of the filter easily accessible for cleaning and/or replacement of parts.

In the modification shown in Fig. 3, the inlet conduit and outlet conduit are both mounted in the top of the filter, the container 1 having a continuous bottom wall. An inlet pipe 30 communicates with the inlet conduit 4 in this modification and extends downwardly adjacent the bottom of the container, terminating in a nozzle 31 which produces a swirling or agitating motion in the water at the bottom of the container.

Before the filter is completely assembled, a quantity of finely divided or comminuted filter charge is preferably wetted or dampened and placed in the container. The nature and quantity of the charge will depend upon such factors as the results desired, the length of time the filter is to be used before cleaning and recharging, the closeness of adjacent surfaces of the filtering element, and the characteristics of the water to be purified. Combinations of various filtering materials may be employed as the charge, or various materials may be used alone, as will be understood by one skilled in the art. In a modification which I have found particularly desirable in the purification of water for drinking purposes, finely divided particles of activated carbon are employed as the principal element of the charge, and with the activated carbon may be combined filter aids such as a diatomaceous earth. For example, 100 grams of finely comminuted activated carbon per square foot of filtering area may be employed alone as the charge, or may be mixed with 15 grams of prepared diatomaceous earth or kieselguhr.

Where a carbonaceous charge is employed, I have found it highly desirable to wet the charge prior to closing the filter, since the finely divided carbon would otherwise remain in the filter for some time before becoming wetted by the water passing through the filter.

In operation, the inlet conduit is mounted to a suitable pressure line, such as a city supply system, and water is introduced into the container under pressure. Due to the swirling and agitating motion produced in the water as it enters the container, the finely divided charge is agitated from the bottom of the container and dispersed in the water as it rises in the container. The differential pressure set up when the faucet 18 is opened causes the water to pass through the filter cloth 20 and to travel along the drainage member 19 to the outlet opening, from which the filtrate passes through the outlet connection 27 and into the outlet conduit. Passage of the water through the filter cloth causes the suspended particles of the charge to be hydrostatically deposited on the filter cloth, thereby forming a uniform layer 32 which covers the filter cloth. Thereafter, the water must pass through the layer of the charge before passing through the filter cloth. Thus, the impurities of the water are retained on the charge rather than on the filter cloth. Although the particles of the charge are unconfined, I have found that once these particles form a layer over the filter cloth there is little tendency for the charge to drop off and fall to the bottom of the container. In case any of the charge does fall to the bottom of the container, the swirling motion of the incoming water reagitates this portion of the charge and causes it to return to the filter cloth. Thus, there is provided a filter having a large effective filter area covered with a uniform layer of a hydrostatically deposited charge which removes from the water color, taste, and odor-forming bodies, as well as suspended solids.

When the flow of the apparatus is reduced below the desired rate by the accumulated impurities removed from the water, the top of the filter may be removed and with it the filter element. The filter element may then be placed under a flowing stream of water whereby the filter charge and impurities are washed from the filter cloth. To recharge the apparatus, it ordinarily is necessary merely to add a fresh filter charge to the container and replace the filter element and top, replacement of the filter cloth usually being unnecessary. The fresh charge is desirably furnished to users of the apparatus in a dampened condition and sealed in a suitable container.

In many municipal water systems the water is treated with a relatively large quantity of chlorine which remains in the water and imparts a disagreeable taste thereto. My filter is operable to remove the taste of chlorine from the water when a carbonaceous charge is employed, thereby rendering the water desirable for drinking purposes.

Due to the large filter area presented in my filter, the rate of flow is considerably higher than in prior filters occupying a similar space. This filter area also provides a large surface for the deposit of water impurities whereby their accumulation per unit area is sufficiently slow to permit extended periods of operation before the rate of filtration decreases to an unsatisfactory point.

The filter cloth or other charge retainer employed is preferably sufficiently porous to permit a free flow and sufficiently retentive to prevent passage therethrough of solid particles of the charge. By sealing the free edges of the filter cloth with a water insoluble adhesive agent, particles of the charge and unfiltered water are prevented from passing between adjacent edges of the filter cloth without passing through the charge.

It is preferred to locate the outlet conduit for the filter element adjacent the central portion thereof in order that the filtrate from each half of the filter element will have substantially the same distance to travel, thus distributing the differential pressure and resistance.

Many variations of my invention will occur to one skilled in the art and such modifications as come within the spirit of my invention are intended to be included in the appended claims.

I claim:

1. A method of forming a filter element which comprises providing a rigid drainage member, enclosing said member with a filter cloth, and sealing adjacent free edges of said cloth together with a water insoluble adhesive to form an integral union.

2. A method of forming a filter element, which comprises covering a rigid drainage member with a filter cloth, sealing together adjacent free edges of said cloth with a water insoluble adhesive agent, and bending said drainage member and filter cloth into a desired tortuous shape.

3. A water filter element, comprising a rigid drainage member surrounded by a filter cloth, the adjacent free edges of said cloth being sealed together with a water insoluble adhesive agent to form a water-tight union.

4. In a water-treating apparatus for the intermittent purification of water as for domestic use, a pressure container, means for introducing a swirling and agitating stream of water into the bottom of said container under pressure including a cap member in the lower portion of said container having a central conduit and a series of branch conduits extending outwardly therefrom in a direction substantially tangential to said central conduit, a top for the container, an outlet conduit suspended to said top, a filter element communicating with said outlet conduit, including a vertically positioned pervious drainage member provided with an opening intermediate its ends and top and bottom, a filter cloth surrounding said drainage member and having an opening corresponding to the opening in said drainage member, and an outlet connection connecting the opening in said drainage member with said outlet conduit to suspend said drainage member within the container, and a layer of a filter charge hydrostatically deposited on said filter cloth, said vertically positioned filter element being bent into tortuous shape, and said container being free from obstructions between the bottom thereof and said filter element.

5. A method of forming a filter element which comprises providing a rigid drainage member, enclosing said member within a filter medium, and sealing adjacent free edges of said filter medium together with a pliable adhesive insoluble in the solution being filtered to form an integral union.

6. A filter element, comprising a rigid drainage member surrounded by a filter medium, the adjacent free edges of said filter medium being sealed together with a pliable adhesive agent insoluble in the solution being filtered to form a tight union.

HERBERT L. DICK.